United States Patent [19]

Zimmerman et al.

[11] 4,026,836
[45] May 31, 1977

[54] ISOCYANURATE FOAM CATALYST

[75] Inventors: Robert L. Zimmerman; Edward E. McEntire; Howard P. Klein, all of Austin, Tex.

[73] Assignee: Texaco Development Corporation, New York, N.Y.

[22] Filed: Dec. 29, 1975

[21] Appl. No.: 644,494

[52] U.S. Cl. .................. 260/2.5 AC; 260/77.5 AC; 260/247.2 R; 260/268 R
[51] Int. Cl.² .......................................... C08J 9/00
[58] Field of Search .............. 260/2.5 AW, 2.5 AC, 260/77.5 AC, 247.2 R, 534 R, 268 R

[56] References Cited
UNITED STATES PATENTS

| 3,817,939 | 6/1974 | Allen et al. ............. 260/2.5 AW X |
| 3,903,018 | 9/1975 | Kolaskowski et al. ... 260/2.5 AW X |

*Primary Examiner*—Lewis T. Jacobs
*Attorney, Agent, or Firm*—Carl G. Ries; Thomas H. Whaley; James L. Bailey

[57] ABSTRACT

New catalysts for isocyanurate foams are those comprising aminomethacrylate salts. The foams are obtained by the polymerization of an aromatic polyisocyanate, and a polyether or polyester polyol in the presence of a blowing agent and said amino methacrylate salts falling within the following structural formula:

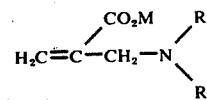

where the radicals represented by R when taken singly are lower alkyl, and hydroxy lower alkyl, and when taken together with the adjacent nitrogen atom are selected from the group consisting of morpholino, C-substituted morpholino, N-alkylpiperazino and C-substituted N-alkylpiperazino, and M is selected from the group consisting of sodium, potassium, cesium, lithium and rubidium. The novel foams are useful in preparing rigid, flexible, semi-rigid, or semi-flexible materials such as panels, slabs or sprayed foam surfaces.

10 Claims, No Drawings

ISOCYANURATE FOAM CATALYST

BACKGROUND OF THE INVENTION

1. Field of the Invention

This invention pertains to the field of isocyanurate catalysts. More particularly this invention relates to the use of aminomethacrylate salts as isocyanurate catalysts.

2. Description of the Prior Art

The use of catalysts in preparing isocyanurate foams via the polymerization of a polyol polyisocyanate and optionally other ingredients in the presence of a blowing agent is well-known. The isocyanurate group formation catalyst is used to trimerize the isocyanate groups to form the isocyanurate linkages. The polyol essentially acts as a modifying or reactive plasticizing agent in the overall polymeric scheme since a polymer containing only isocyanurate groups is itself too friable. Thus, the isocyanurate foam contains both isocyanurate groups as well as urethane linkages, with said urethane linkages acting to plasticize the foam. Initially the reaction proceeds to give primarily a urethane quasi-prepolymer containing active isocyanate groups. Subsequently, the excess isocyanate reacts to form isocyanurate groups which ultimately produces a urethane-modified polyisocyanurate polymer.

Depending upon process condition utilized, both rigid and flexible polyisocyanurate foams may be prepared as well as the semi-flexible and semi-rigid types. Some main uses of the resultant foam include those of thermal insulation, and as building materials and the like. Examples of some prior art isocyanurate foams and methods of preparation are described in U.S. Pat. Nos. 3,745,133; 3,644,232; 3,676,380; 3,168,483; and 3,519,950, to name a few.

A number of prior art polyisocyanurate catalysts are known. However, in many instances these catalysts suffer from one or more deficiencies. Particularly, while useful in promoting trimerization of the isocyanate groups to isocyanurate polymer units the catalysts cause foam processing problems. Thus, in some instances such well-known catalysts as potassium octoate and potassium acetate catalysts are overly temperature dependent. Thus, an unduly rapid end-cure is realized in some cases with such catalysts. That is, with a gradual rise in temperature, catalyst activity is increased in an excessive manner, making it difficult to properly control foam rise. Yet, in many cases, typified by slab formation, a uniform cure rate is particularly sought.

In other situations catalysts such as amine-type isocyanurate catalysts including amino hexaohydrotriazines are unduly slow with respect to their reactivity rate resulting in a lagging end-cure. As a result, the foam so cured is not sufficiently cured in time to properly handle. The soft "green" foam coming out of the machine will have a tendency to warp if, for example, panel board is being produced.

In still further cases use of many catalysts of this type such as xanthates, dithiocarbamates or volatile amines is accompanied by an odor problem of varying severity. A suitable isocyanurate catalyst therefore should be relatively odor-free and give a relatively long cream time with quick rise and task free times.

It would therefore be a considerable advance in the art if a new class of isocyanurate catalysts were discovered which overcomes the just discussed processing drawbacks whereby optimum foam cure rates could be achieved. It would be a further desirable achievement if such new class of isocyanurate chemical catalysts could be equally adopted in preparing isocyanurate foams useful as both rigid and flexible foams in making panels, slabs and sprayed foams.

It therefore is an object of the present invention to provide new odor-free isocyanurate catalysts which give a long cream time and short rise and tack free times. It is further an object of this invention to provide isocyanurate catalysts which can be utilized in preparing rigid, flexible, semi-rigid or semi-flexible isocyanurate foams. Another object of the present invention is to provide isocyanurate foams utilizing a new class of isocyanurate group formation catalysts. Finally, it is an object of the present invention to prepare modified polyisocyanurate foams which have suitable thermal stability, uniform cell structure, low friability, excellent adhesion and other sought-after properties, using a new class of isocyanurate catalysts.

SUMMARY OF THE INVENTION

It has now been found that certain aminomethacrylate salts are extremely useful as catalysts in preparing modified cellular polyisocyanurate foams. Said foams are prepared by reacting together in the presence of a blowing agent, a polyether or polyester polyol, and an aromatic polyisocyanate utilizing as an isocyanurate group formation catalyst an aminomethacrylate salt. The resultant cellular polymer thus contains both recurring isocyanurate and urethane linkages as polymer groups.

The aminomethacrylate salts of the invention used here fall within the following structural formula:

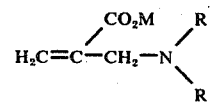

where the radicals represented by R when taken singly are lower alkyl, and hydroxy lower alkyl, and when taken together with the adjacent nitrogen atom are selected from the group consisting of morpholino, C-substituted morpholino, N-alkylpiperazino and C-substituted N-alkylpiperazino, and M is selected from the group consisting of sodium, potassium, cesium, lithium and rubidium.

DETAILED DESCRIPTION OF THE INVENTION

As noted above, the isocyanurate foams of the present invention are prepared by mixing a polyisocyanate, a polyether or polyester polyol, an inert blowing agent and the above defined aminomethacrylate salt as an isocyanurate group formation catalyst under conventional foaming condition utilizing conventional mixing devices employed in the manufacture of polymer foams. The mixing of the materials for the formulation of the reaction product is not critical to the invention. Examples of conventional polymer foam formation processes and equipment are described in Ferrigeno "Rigid Plastic Foams", Reinhold Publishing Corporation, New York, New York, 1963.

The aminomethacrylate salts used here may be formed via a number of synthetic routes. One excellent preparative technique includes reaction via a modified Mannich reaction route of malonic acid, formaldehyde and the appropriate amine including an N-di-loweralkanolamine, dialkylamine, morpholine, a C-substituted morpholine such as morpholine substituted at one or more of the carbon positions with lower alkyl radicals as methyl, ethyl, propyl, butyl, etc., N-lower alkyl piperazine such as N-methyl, ethyl, propyl, butyl, piperazine, and a C-substituted N-lower alkyl piperazine. When the term "lower alkyl" is used herein it is meant to include straight and branched carbon chains containing 1-4 carbon atoms such as methyl, ethyl, etc. Again the C-substituted piperazine of morpholine may contain one or more lower alkyl substituents on the ring carbons.

During the reaction described above both decarboxylation and double bond formation reactions occur to yield the final product. It is postulated that the first active hydrogen of malonic acid is replaced with one mole of formaldehyde and an amine in a conventional Mannich reaction. Then decarboxylation occurs simultaneous with or followed by addition of another mole of formaldehyde to the second active hydrogen of malonic acid. Finally, dehydration of this intermediate occurs to give the final vinyl structure.

The resultant aminomethacrylate products from the above reaction when put into proper salt form then define a chemical compound falling within the following structural formula:

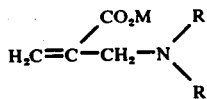

where the radicals represented by R when taken singly are lower alkyl, and hydroxy lower alkyl, and when taken together with the adjacent nitrogen atom are selected from the group consisting of morpholino, C-substituted morpholino N-alkylpiperazino and C-substituted, N-alkylpiperazino, and M is selected from the group consisting of sodium, potassium, cesium, lithium and rubidium.

Preferred products falling within the above formula are those where R when taken singly is hydroxy ethyl or when the radicals R are taken together with the adjacent nitrogen atom representing morpholino, or N-methyl piperazino.

We have also found that certain of the catalyst compounds here are novel per se. These include those compounds where in the above structural formula R is hydroxy lower alkyl when taken singly or when the R radicals when taken together with the adjacent nitrogen atom represent morpholino or C-lower alkyl substituted morpholino.

Any aromatic polyisocyanate may be used in the practice of the instant invention. Typical aromatic polyisocyanates include m-phenylene diisocyanate, p-phenylene diisocyanate, polymethylene polyphenyl-isocyanate, 2,4-tolylene diisocyanate, 2,6-tolylene diisocyanate, dianisidine diisocyanate, bitolylene diisocyanate, naphthalene-1,4-diisocyanate, diphenylene-4,4'-diisocyanate, aliphatic-aromatic diisocyanates, such as xylylene-1,4-diisocyanate, xylylene-1,3-diisocyanate, bis(4-isocyanatophenyl) methane, bis(3-methyl-4-isocyanatophenyl)methane, and 4,4'-diphenylpropane diisocyanate.

Greatly preferred aromatic polyisocyanates used in the practice of the invention are methylene-bridged polyphenyl polyisocyanate mixtures. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing the methylene bridged polyphenyl polyamines and corresponding methylene bridged polyphenyl polyisocyanates therefrom are described in the literature and in many patents, for example, U.S. Pat. Nos. 2,683,730; 2,950,263; 3,012,008; 3,444,162; and 3,352,979.

Most preferred methylene bridged polyphenyl polyisocyanate mixtures used here contain from about 20 to about 100 weight percent methylene diphenylisocyanate isomers with the remainder being polymethylene polyphenyl isocyanates having higher functionalities and higher molecular weights. Typical of these are polyphenyl polyisocyanate mixtures containing about 20 to 100 weight percent methylene diphenyldiisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. The isocyanate mixtures are known, commercially available materials and can be prepared by the process described in U.S. Pat. No. 3,362,979, issued Jan. 9, 1968 to Floyd E. Bentley.

Any conventional polyether or polyester polyol may be used in making the isocyanurate foams here. Illustrative of these one can mention the following types:

a. Polyoxyalkylene polyols including the adducts of alkylene oxides with, for example, water, ethylene glycol, diethylene glycol, propylene glycol, dipropylene glycol, glycerol, 1,2,6-hexanetriol, 1,1,1-trimethylolethane, 1,1,1-trimethylolpropane, pentaerythritol, sorbitol, sucrose, lactose, alphamethylglucoside, alpha-hydroxyalkylglucoside, ammonia, triethanolamine, triisopropanolamine, ethylenediamine, diethylenetriamine, novolac resins, phosphoric acid, benzenephosphoric acid, polyphosphoric acids such as tripolyphosphoric acid and tetrapolyphosphoric acid, phenolaniline-formaldehyde ternary condensation products, aniline-formaldehyde condensation products and the like. The alkylene oxides employed in producing the polyoxyalkylene polyols normally have from 2 to 4 carbon atoms. Propylene oxide and mixtures of propylene oxide with ethylene oxide are preferred. It is known that random or block structures can be obtained depending upon the particular known procedures used for their preparation.

b. Polyesters of polyhydric alcohols and polycarboxylic acids such as those prepared by the reaction of an excess of ethylene glycol, propylene glycol, 1,1,1-trimethylolpropane, glycerol, or the like, with phthalic acid, adipic acid, and the like.

c. Lactone polyols prepared by reacting a lactone such as epsilon-caprolactone or a mixture of epsilon-caprolactone and an alkylene oxide with a polyfunctional initiator such as a polyhydric alcohol, an amine, or an amino-alcohol.

d. Phosphorus-containing derivatives such as tris (dipropylene) glycol phosphite and other phosphites.

e. The polymer/polyols produced by the in situ polymerization of a vinyl monomer in a polyol, as disclosed in U.S. Pat. No. 3,304,273; U.S. Pat. No. 3,383,351 and U.S. Pat. No. 3,523,093.

The foregoing are merely illustrative and represent only a small number of the many polyols known in the art that can be employed with the catalyst salts here in the process of this invention.

The polyol or polyol mixture employed can have a hydroxyl number which can vary over a wide range. In general, the hydroxyl number of the polyols employed can range from about 20, and lower, to about 1,000, and higher, preferably from about 20 to 800, and more preferably, from 35 to about 700. The hydroxyl number is defined as the number of milligrams of potassium hydroxide required for the complete neutralization of the hydrolysis product of the fully acetylated derivative prepared from 1 gram of polyol. The hydroxyl number can also be defined by the equation:

$$OH = \frac{56.1 \times 1000 \times f}{M.W.}$$

where

OH = hydroxyl number of the polyol.

$f$ = average functionality, that is, the average number of hydroxyl groups per molecule of polyol.

M.W. = average molecular weight of the polyol.

The exact polyol employed depends upon the end-use of the polyisocyanurate foam. The molecular weight and the hydroxyl number are selected properly to result in flexible, semi-flexible, semi-rigid or rigid products. The polyol preferably possesses a hydroxyl number of from about 200 to about 1,000 when employed in rigid formulations, from about 50 to about 250 for semi-flexible foams, and from about 20 to 70 or more when employed in flexible foam formulations. Such limits are not intended to be restrictive, but are merely illustrative of the large number of possible combinations of the polyols that can be employed.

Greatly preferred polyether or polyester polyols have a hydroxyl number within a range of from about 100 to about 500, and a molecular weight from about 100 to about 1,000.

Foaming is accomplished by employing in a minor amount (for example, from about 0.5 to 25 weight percent, based on total weight of the reaction mixture), of blowing agents which are vaporized by the exotherm of the isocyanato-reactive hydrogen reaction. The preferred blowing agents are certain halogen-substituted aliphatic hydrocarbons which have boiling points between about −40° C. and 70° C., and which vaporize at or below the temperature of the foaming mass. The blowing agents include, for example, trichloromonofluoromethane, dichlorodifluoromethane, dichloromonofluoromethane, dichloromethane, trichloromethane, bromotrifluoromethane, chlorodifluoromethane, chloromethane, 1,1-dichloro-1-fluoroethane, 1,1-difluoro-1,2,2-trichloroethane, chloropentafluoroethane, 1-chloro-1-fluoroethane, 1-chloro-2-fluoroethane, 1,1,2-trichloro-1,2,2-trifluorothane, 1,1,1-trichloro-2,2,2-trifluoroethane, 2-chloro-1,1,1,2,3,3,4,4,4-nonafluorobutane, hexafluorocyclobutene, and octofluorocyclobutane. Other useful blowing agents are water and low-boiling hydrocarbons such as butane, pentane, hexane, cyclohexane, and the like. Many other compounds easily volatilized by the exotherm of the isocyanato-reactive hydrogen reaction also can be employed. A further class of blowing agents includes the thermally unstable compounds which liberate gases upon heating, such as N,N-dimethyl-N,N'-dinitrosoterephthalamide.

The amount of blowing agent used will vary with the density desired in the foamed product. In general it may be stated that for 100 grams of reaction mixture containing an average isocyanate/reactive hydrogen ratio of about 1:1, about 0.005 to 0.3 mole of gases are used to provide densities ranging from 30 to 1 pound per cubic foot respectively.

In addition to the aminomethacrylate salt catalysts an additional isocyanurate group formation catalyst or catalysts to promote trimerization may also be employed as well as conventional polyurethane catalysts. Such catalysts include strong bases, alkali metal salts of carboxylic acids, non-basic metal salts of carboxylic acids and aliphatic tertiary amines. For example, suitable strong bases include quaternary ammonium hydroxide, alkali metal hydroxide and alkali metal alkoxides. Suitable alkali metal salts of carboxylic acids include, for example, sodium benzoate, and the like. Examples of suitable tertiary amines are N,N'-diethylpiperazine, N,N'-dimethylpiperazine, trialkylamines such as trimethylamine, triethylenediamine, tributylamine, 2,4,6-tris(dimethylaminomethyl)phenol, and N,N',N''-tri(dimethylaminopropyl) hexhydro-s-triazine and the like.

The particular amount of catalyst employed can vary over a wide range and is not critical so long as it is present in an amount sufficient to promote trimerization of the isocyanate mixture. Preferably, the catalyst is added in an amount of about 0.0005 to about 0.025 equivalents for each equivalent of isocyanate employed. An optimum amount would be from about 0.001 to about 0.01 equivalents per equivalent of isocyanate. Expressed in other terms, the catalyst is preferably added in an amount of from about 0.03 up to about 5.0 parts by weight, based upon the total foam formulation, i.e., 100 parts by weight.

If desirable, the isocyanurate foams of the invention can be formulated to include flame retardant components to improve the fire retardancy of the foams. Any known fire retardant component compatible with rigid isocyanurate foams can be employed. This would include both the reactive and additive type fire retardants. Representatives of the additive types include halogenated organic phosphates such as tris(chloroethyl)phosphate, tris(2,3-dibromopropyl)phosphate, triphenyl phosphite, diammonium phosphate, and antimony oxide. Representatives of the chemically bound types are diethyl-N,N'-bis(2-hydroxyethyl)aminomethyl phosphonate, chlorendic acid derivatives, and phosphorous-containing polyols. When employed, the fire retardant component is added to the above-described isocyanate mixture with some other component or as a preformed mixture with some other component described hereinbefore, in an amount of about 1 to about 20 weight percent of the total foam formulation.

Furthermore, fillers can be employed in the preparation of the isocyanurate foams, if desired in amounts within the range of about 0.1 to about 20 weight percent of the total foam formulation. Any conventional filler known in the art to be compatible with isocyanurate foam manufacture can be employed, such as hydrated alumina, polyethylene, aluminum powder, and various clays and talcs.

An emulsifier or stabilizing agent may also be used in the preparation of the isocyanurate foams of this invention including, for example, sulfonated castor oil or the like. One preferred foam stabilizer is that based on silicone such as, for example, a polydimethyl siloxane or a polyoxyalkylene block copolymer of a silane. The latter type of silicone oil is disclosed in U.S. Pat. No.

2,834,748. Other surfactants or emulsifying or dispersing agents which may be used include ethylene oxide modified sorbitan or monopalmitate or ethylene oxide modified polypropylene ether glycol.

The amount of polyol employed in relation to the organic aromatic polyisocyanate is not critical, but preferably ranges in an amount of from about 0.1 to about 0.8 equivalents per equivalent of polyisocyanate. Optimally, about 0.2 to about 0.6 equivalents per equivalent of polyisocyanate is employed. Moreover, the polyol can be added to the polyisocyanate as a separate component or as a preformed mixture with one or more of the other components.

To prepare the isocyanurate foams of the invention, the above discussed ingredients may be simultaneously, or independently intimately mixed with each other by the so-called "one-shot" method to provide a foam by a one-step process. Proportions of ingredients are properly adjusted to give flexible, rigid, semi-flexible or semi-rigid foams. In preparing flexible foams usually water is also employed as part of the blowing agent. In addition to the one-shot method the "quasi prepolymer method" may also be employed. Here, a portion of the polyol is reacted in the absence of a catalyst with the polyisocyanate component. Thereafter to prepare a suitable foam, the remaining portion of the polyol is added and reaction allowed to go to completion in the presence of catalyst along with other appropriate additives such as blowing agents, foam stabilizing agents, fire retardants, etc.

Again, the isocyanurate foams of the present invention may be prepared over a wide range of temperatures. However, normally the reaction is initiated at room temperature, and the only heat involved is that generated by the polymerization itself.

The invention will be illustrated further with respect to the following specific examples, which are given by way of illustration and not as limitations on the scope of this invention.

EXAMPLE I

PREPARATION OF N-(METHYLPIPERAZINO) METHACRYLIC ACID

To a 500 ml three necked round bottom flask equipped with an addition funnel, water separator, mechanical stirrer, thermometer, and nitrogen atmosphere was charged 52 g of malonic acid. Then 50 g of N-methylpiperazine was slowly added while cooling with an ice bath. During 45 minutes, 121.6 g of 35.8% formalin was added dropwise through the addition funnel while the temperature was maintained at less than 20° C. The reaction was allowed to stand overnight at room temperature and then heated to 98° C. for 5 hours.

An aspirator vacuum was then applied for 2 hours with continued heating to remove volatiles. The resultant reddish paste was dissolved in 150 ml of hot isopropanol and allowed to crystallize.

An alternate name for this compound is [2-(N-methylpiperazino)methyl]-2-propenoic acid.

EXAMPLE II

MORPHOLINOMETHACRYLIC ACID

To a 500 ml round bottom, 3-necked flask, fitted with a condenser, thermometer, stirrer, gas bubbler and dropping funnel, was added 104 g (1.0 mole) malonic acid and 60 ml deionized water. The resulting endothermic solution was slightly cloudy after stirring for 30 minutes. The flask was cooled in an ice bath and swept with a nitrogen flow, while 87 g (1.0 mole) of morpholine was added dropwise at a rate to keep the temperature below 30° C. To the resulting light yellow solution, cooled at 20° C., was added 162 g (2.0 mole) of 37% aqueous formaldehyde at a rate so as to control the rapid evaluation of carbon dioxide and the temperature at 20°-30° C. After the formaldehyde addition was complete, the flask was heated to 35° C. and swept with nitrogen until the decarboxylation was complete (~3 hours).

The homogeneous reaction mixture was heated on a mantel to 30°-40° C. while water was stripped using an aspirator at a temperature to a maximum of 100° C. to remove 170 g water. The remaining crude product was a viscous, light brown liquid that slowly crystallized on standing. Yield = 162 g (94.5%) of the desired compound, alternatively named as 2-carboxyprop-2-enyl morpholine.

EXAMPLE III

BISHYDROXYETHYLAMINOMETHACRYLIC ACID

The procedure of Example II was used, except that 105 g (1.0 mole) diethanolamine was substituted for the morpholine. Total time for decarboxylation was 5 hours at 40°-50° C. A clear light yellow aqueous solution of the crude acid was obtained. The alternate name for this compound is 2-carboxyprop-2-enyl diethanolamine.

EXAMPLE IV

PREPARATION OF POTASSIUM BISHYDROXYETHYLAMINOMETHACRYLATE

To the acid solution of compound Example III was added a solution of 59 g (0.96 mole) 90–92% potassium hydroxide in 75 ml water. The resulting salt solution was clear, and slightly basic (pH 9–10). Polyethylene glycol (mw~300) in an amount of 100g was added and the resulting solution was stripped free of all water using high vacuum. A 69% salt solution that was quite viscous was obtained. This solution was further diluted wih triethyleneglycol to give a slightly viscous, 50% by weight solution of the title salt.

EXAMPLE V

POTASSIUM MORPHOLINOMETHACRYLATE

To a small beaker was added 34.2 g (0.20 mole) of crude morpholinomethacrylic acid (Example II compound) and 60 ml methanol. The mixture was stirred until a clear solution resulted. Then, a solution of 12.3 g (0.20 mole) 91% potassium hydroxide in 50 ml methanol was added. The resulting solution was only slightly basic (pH = 8–9). Triethyleneglycol, 40 g, was added and the resulting solution was stripped on a rotary evaporator to remove methanol and water. A slightly viscous solution, that was 51% by weight of the title salt, was obtained.

EXAMPLE VI

PREPARATION OF FOAMS

The above catalyst and others prepared were then tested for their catalytic activity as isocyanurate foam catalysts in the following manner. A novolak based polyol having a hydroxyl number of 194 and a functionality of 2.4 was used as the polyol source. Freon was the blowing agent, and a methylene-bridged polyphenyl polyisocyanate mixture was the polyisocyanate source. This particular mixture contained about 46% by weight methylene diphenylisocyanate isomers of which about 20% is 2-4'-isomer, the remainder being higher functionality and higher molecular weight polymethylene polyisocyanates which have an average functionality of about 2.7. The particular surfactant used was a silicone polyether.

Foam formulations are given in Table I below:

TABLE I

| Foam No. | Catalyst | Polyol | Surfactant | Blowing Agent | Catalyst Solution Amount | Polyisocyanate | Percent Catalyst/Solvent |
|---|---|---|---|---|---|---|---|
| I | Potassium N-methyl piperazino methacrylate | 51.6 | 1.0 | 24 | 4 | 119.4 | 45%/DEG.* |
| II | Potassium morpholino methacrylate | 51.6 | 1.0 | 24 | 3 | 119.4 | |
| III | Potassium morpholino methacrylate | 52 | 1.0 | 24 | 3 | 120 | 51%/TEG** |
| IV | Sodium morpholino methacrylate | 51.6 | 1.0 | 24 | 4 | 119.4 | 49%/DEG |
| V | Potassium bishydroxy ethylamino methacrylate | 51.0 | 1.0 | 24 | 5 | 119.4 | 50%/PEG*** |
| VI | Cesium morpholino methacrylate | 51.6 | 1.0 | 24 | 4 | 119.4 | 50%/TEG |

*Diethylene glycol
**Triethylene glycol
***Polyethylene glycol

To prepare and test the foams of Table I, the polyol was mixed with surfactant, blowing agent and catalyst to form a B component. The polyisocyanate was then added to the B component and the reaction mixed for five seconds using a high speed stirrer. The foam was then poured into a box and allowed to rise. In each case foams produced from the various catalysts falling within the scope of the invention had acceptable cream, tack free and rise times. Profile results are given below in Table II.

TABLE II

| Foam No.* | Cream Time** | Tack Free Time** | Rise Time** |
|---|---|---|---|
| I | 7 | 40 | 55 |
| II | 11 | 35 | 55 |
| III | 13 | 55 | 75 |
| IV | 9 | 80 | 80 |
| V | 11 | 55 | 65 |
| VI | 10 | 120 | 90 |

*From Table I
**In seconds

Additional confirming foam runs were made utilizing catalysts of the type described above. In some cases a combination of catalysts were used involving a catalyst of the invention and another available catalyst. Fast curing foams were made which nevertheless could be properly processed. In each instance the foams had good dimensional stability, resistance to heat distortion effects, good flammability resistance, and low friability. In addition, and most importantly, the catalyst had a suitable cure time such that proper end-cure was achieved within the sought-after time. Both cream time and rise times were acceptable.

It is to be understood that the above examples are given for the purpose of illustration and that a wide variety of polyisocyanates, inert blowing agents, foam stabilizers, polyols, etc. can be used with equal facility employing the catalysts herein described, providing that the teachings of the disclosures are followed.

Although the invention has been described in considerable detail in the foregoing disclosure, it is to be understood that such details are solely for the purpose of illustration and that many variations can be made by those skilled in the art without departing from the spirit and scope of the invention except as set forth in the claims.

We claim:

1. A cellular polymer containing recurring isocyanurate and urethane linkages, which polymer comprises the reaction product obtained by bringing together in the presence of a blowing agent, a polyether or polyester polyol and an aromatic polyisocyanate utilizing as an isocyanurate group formation catalyst an aminomethacrylate salt having the following structural formula:

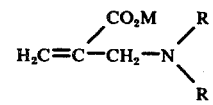

where the radicals represented by R when taken singly are lower alkyl, and hydroxy lower alkyl, and when taken together with the adjacent nitrogen atom are selected from the group consisting of morpholino, C-substituted morpholino N-alkylpiperazino, and C-substituted N-alkylpiperazino and M is selected from the group consisting of sodium, potassium, cesium, lithium and rubidium.

2. The polymer of claim 1 wherein said polyisocyanate is a methylene-bridged polyphenyl polyisocyanate mixture.

3. The polymer of claim 1 where R is hydroxyethyl.

4. The polymer of claim 1 where each R is taken together with the adjacent nitrogen and is morpholino.

5. The polymer of claim 1 where each R is taken together with the adjacent nitrogen atom and is N-methylpiperazino.

6. In a process for preparing a cellular polymer containing recurring isocyanurate and urethane linkages, which polymer comprises the reaction product obtained by bringing together in the presence of a blowing agent, a polyether or polyester polyol, and aromatic polyisocyanate, and an isocyanurate group formation catalyst, the improvement which comprises utilizing as said isocyanurate catalyst an aminomethacrylate salt represented by the following structural formula:

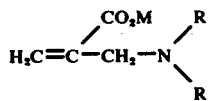

where the radicals represented by R when taken singly are lower alkyl, and hydroxy lower alkyl, and when taken together with the adjacent nitrogen atom are selected from the group consisting of morpholino, substituted morpholino, N-alkylpiperazino, and C-substituted N-alkylpiperazino and M is selected from the group consisting of sodium, potassium, cesium, lithium and rubidium.

7. The process of claim 6 wherein said polyisocyanate is a methylene-bridged polyphenyl polyisocyanate mixture.

8. The process of claim 6 wherein R is hydroxyethyl.

9. The method of claim 6 wherein each R is taken together with the adjacent nitrogen atom and is morpholino.

10. The method of claim 6 wherein each R is taken together with the adjacent nitrogen atom and is N-methylpiperazino.

* * * * *